April 7, 1931.  H. R. CHANTRY  1,799,884
MEANS FOR ATTACHING WHEELS TO SHAFTS
Filed May 19, 1928   2 Sheets-Sheet 1
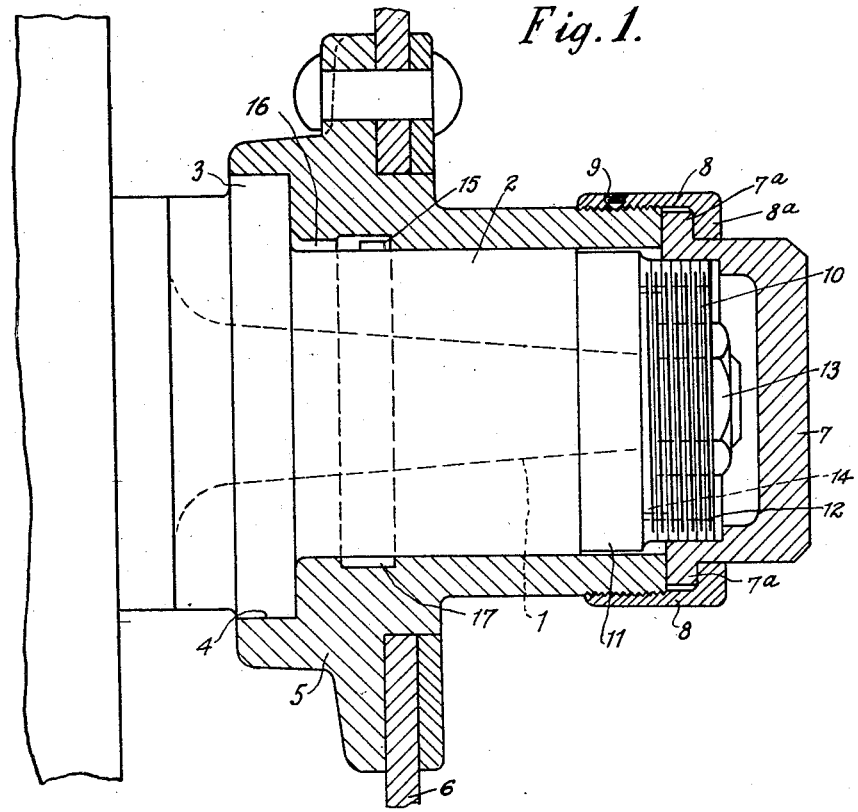
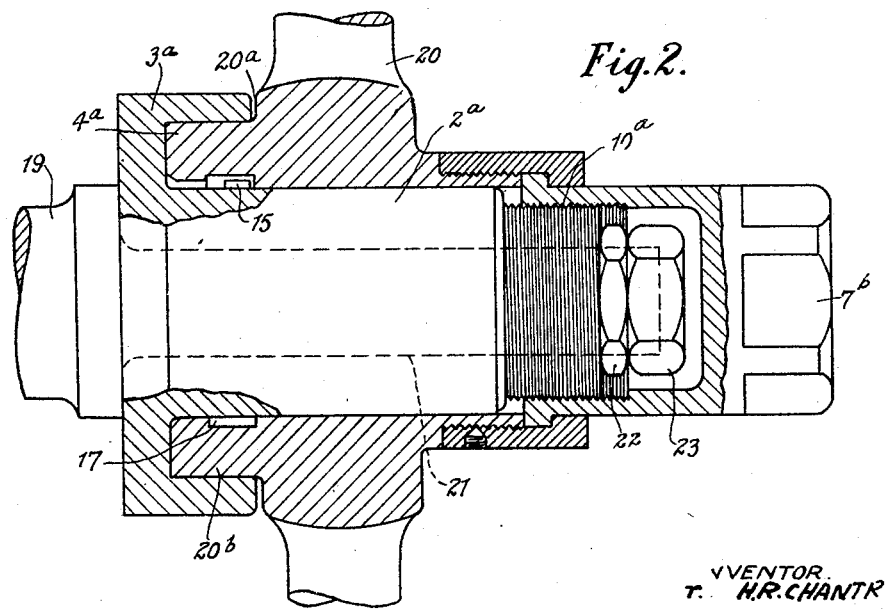
INVENTOR.
H. R. CHANTRY
G. Hughes
ATTORNEY April 7, 1931. H. R. CHANTRY 1,799,884
MEANS FOR ATTACHING WHEELS TO SHAFTS
Filed May 19, 1928 2 Sheets-Sheet 2

INVENTOR.
H. R. CHANTRY
per G. Hughes
ATTORNEY

Patented Apr. 7, 1931

1,799,884

UNITED STATES PATENT OFFICE

HARRY RICHARD CHANTRY, OF BRIGHTON, ENGLAND

MEANS FOR ATTACHING WHEELS TO SHAFTS

Application filed May 19, 1928, Serial No. 279,115, and in Great Britain March 30, 1928.

This invention relates to improvements in means for attaching motor road vehicle wheels, propellers and the like to axles and shafts.

According to this invention the wheel hub or its equivalent and the axle or its equivalent are provided with a projection and groove or slot, one of which must fit into the other to ensure proper alignment of two eccentric portions. For instance the hub of a wheel can be formed with an axially directed groove and the axle fitted with a short radial projection. When the invention is to be adapted to front wheels of motor vehicles, a sleeve can be adapted over the stub axle to support the usual bearings, and this sleeve can be fitted with an eccentric flange on its inner face to fit into an eccentric recess in the inner face of the wheel hub, the said sleeve being held on by a nut threaded on to the free end of the stub axle, the hub carrying at its outer end a relatively rotatable cap nut threaded on to the outer end of the said sleeve so as to draw the hub on to the axle.

In order that my invention may be clearly understood and readily carried into effect, I have appended hereto two sheets of drawings illustrating embodiments of same and wherein, Figs. 1 and 2 are sectional elevations of alternative forms.

Figure 3:
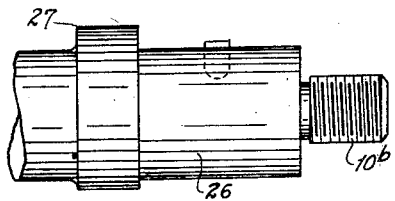
Fig. 3 shows in side elevation a shaft shaped to carry a wheel according to this invention.
Figure 4:
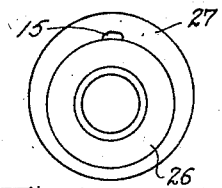
Fig. 4 is an end view of Fig. 3.

Referring to the drawings, in Fig. 1, the wheel stub axle 1 has mounted over it a sleeve 2 the interior of which is similar to the interior of an ordinary wheel hub. The sleeve 2 has a flange like eccentric portion 3 adapted to fit fairly nicely into a corresponding recess 4 in the inner end of a hub 5 to which the wheel spokes or disc 6 are attached in any suitable manner. The hub 5 is shaped to slide easily over the sleeve 2 and it carries a relatively rotatable nut 7, which can be secured by a ring nut 8 threaded on to the hub 5 and secured by any suitable means, for instance a set screw 9. The ring 8 has an annular part 8a between which and the end of the hub 5 is arranged a flange 7a of the nut 7.

The nut 7 is adapted to be engaged over the threaded outer surface 10 of a continuation 11 of the sleeve 2, this continuation preferably being an element separate from the sleeve 2 but closing the end of the sleeve to secure the ball or roller races in the sleeve in position. The member 11 is formed with a cylindrical recess 12 to receive the stub axle nut 13 threaded on to the end of the axle 1 projecting through a central opening in the member 11, a washer 14 being arranged under the nut 13. The eccentric flange 3 and recess 4 will lock the wheel to the sleeve 2 which is free to rotate on the stub axle.

To ensure proper alignment of the flange 3 and recess 4 a short radial projection 15 is carried by the sleeve 2, and this projection has to be aligned with an axially directed groove or slot 16 in the hub 5 when attaching the wheel. The nut 7 can now be applied to the slightly exposed threaded outer end 10 of the member 11 and the hub drawn on to the axle by rotating the said nut 7 until the projection 15 enters a channel 17 around the interior of the hub 5. The purpose of the channel 17 is to allow for slight relative movement of the parts 3 and 4.

Figure 9:
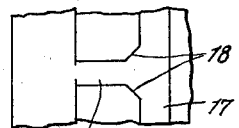
Fig. 9 is a detail plan view of the registering groove in the hub.
Figure 5:
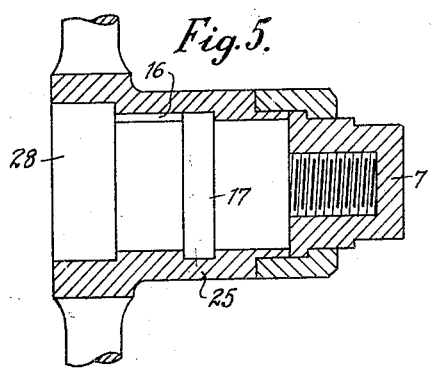
Fig. 5 is a sectional side elevation of a wheel hub.
Figure 6:
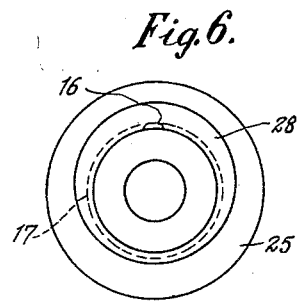
Fig. 6 is an end view of Fig. 5.
Figure 7:
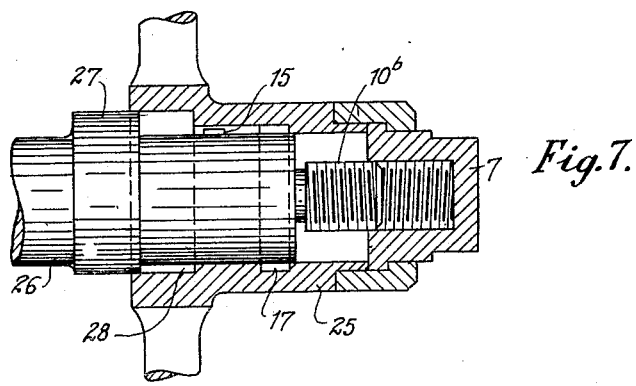
Fig. 7 shows in section the hub being engaged over the axle.
Figure 8:
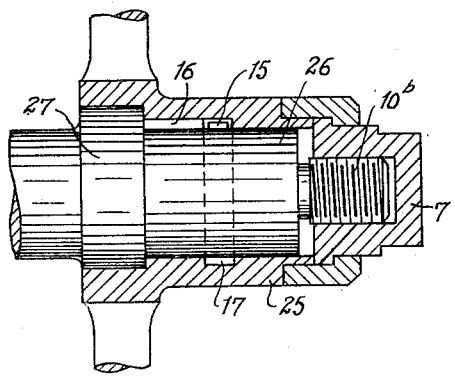
Fig. 8 shows the hub fully engaged with the axle.

In Fig. 9 is shown in detail broken plan the slot or groove 116 and the channel 17, the corners of the slot or groove 16 where it joins the channel 17 being bevelled or rounded as indicated at 18 to facilitate engagement of the stub or projection 15 in the groove or slot 16 when removing the wheel.

In Fig. 2 a shaft 19 is shown with a pulley or wheel 20 attached thereto, the sleeve 2a being slid on to a concentric axial extension 21 of the shaft, this extension being threaded to receive a securing nut 22 and lock nut 23. The sleeve 2a carries an integral portion 3a adapted to receive in an eccentric recess an eccentric portion 20b of the boss 20a of the wheel or pulley. The sleeve 2a has a threaded portion 10a to receive the nut 7b for drawing on the hub 20a, and the enlargement 3a has a short radial projection 15 engaging in a concentric channel 17 and adapted to ensure correct registration of the parts 3a and 4a by engagement in an axially directed groove 16 as described with reference to Fig. 1. The said projection 15 can be a resiliently supported member, for instance, a spring plunger.

In Figs. 3 to 8 inclusive I have shown the rigid attachment of a wheel hub 25 to a shaft or axle 26 which is formed with an integral eccentric flange 27 for engagement in a corresponding recess 28 in the hub. The projection 15, groove 16 and channel 17 are arranged similarly to the manner previously described. The shaft or axle 26 has a threaded extension 10b to receive the rotary nut 7b carried by the hub 25 also as previously described. These Figures 3 to 8 merely shown the manner of affixing a hub to a shaft or axle.

By providing the channel 17 the projection 15 will not interfere with any jambing of the two engaging eccentric parts should the nut 13 work loose, whereby the said jambing will securely hold the wheel or propeller against working loose.

What I claim is:—

Means for attaching a hub member to a shaft member comprising an eccentric flange like part on the shaft and a corresponding eccentric recess in the hub, a lateral projection on the one and an axially directed groove in the other to receive said projection for ensuring correct alignment of the hub and shaft, said groove terminating at its inner end in a circumferential channel.

In witness hereof I have signed this specification.

HARRY RICHARD CHANTRY.